May 28, 1968  J. BRONSON  3,385,488
CLAMPING DEVICE
Filed March 31, 1967  2 Sheets-Sheet 1
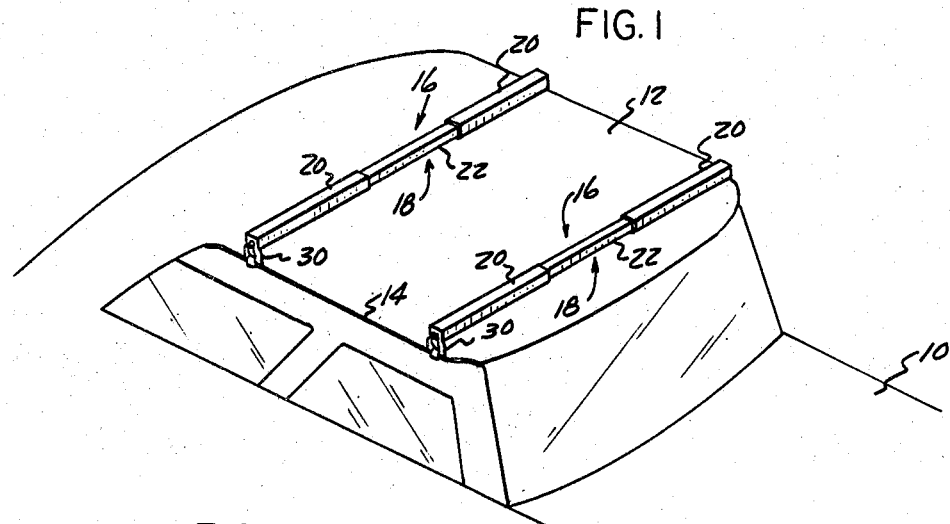
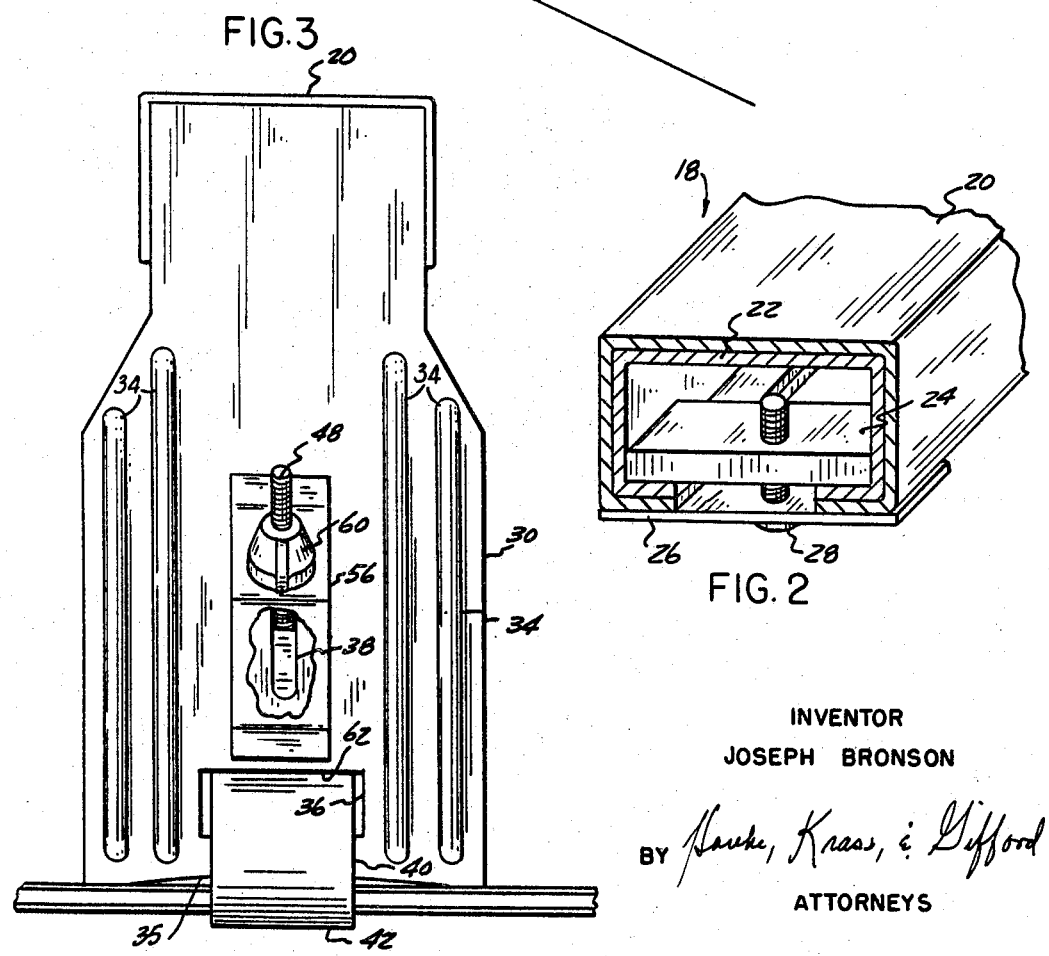
INVENTOR
JOSEPH BRONSON
ATTORNEYS May 28, 1968  J. BRONSON  3,385,488
CLAMPING DEVICE
Filed March 31, 1967  2 Sheets-Sheet 2

INVENTOR
JOSEPH BRONSON
BY Hauke, Kraus, & Gifford
ATTORNEYS

United States Patent Office 3,385,488
Patented May 28, 1968

3,385,488
CLAMPING DEVICE
Joseph Bronson, 15397 Cruse, Detroit, Mich. 48227
Filed Mar. 31, 1967, Ser. No. 631,569
11 Claims. (Cl. 224—42.1)

ABSTRACT OF THE DISCLOSURE

A clamping device for mounting a carrier structure above the roof of an automotive vehicle. The clamping device includes a pair of interconnected clamping members arranged for attachment to the rain gutter formed along a lateral side of the roof of the vehicle.

A plate-like, upright support member has a lower edge seated in the trough of the rain gutter and an upper portion adapted for attachment to the carrier structure. A strap-like clamping member has a hook portion engageable with the lower surface of the rain gutter. The shank of the hook extends around the lateral edge of the rain gutter and upwardly through an aperture in the upright member. The back of the shank has an arcuate surface bearing against the upper edge of the aperture so that the hook clamping portion is cammed from a release position, laterally spaced with respect to the rain gutter, toward a clamping position when an upward clamping force is applied to the upper end of the shank.

BACKGROUND OF THE INVENTION

1. *Field of the invention*

This invention relates to clamping devices and more specifically to a pair of interconnected clamping members arranged to rigidly engage the rain gutter of an automotive vehicle.

2. *Description of the prior art*

It is often advantageous to transport cargo or mount accessories to the roof of an automotive vehicle. A major problem with conventional roof mounting devices is that an effective and simple clamping arrangement which is both easily attachable and releasible while providing a secure fastening has not been available. Furthermore, conventional clamping devices are usually restricted to a particular type of roof structure. Where such devices are anchored to the rain gutter of the roof, prior art devices provide an unreliable fastening to the gutters of some of the current model vehicles.

The present invention obviates the problems of the prior art by providing a clamping arrangement useful for securing a broad variety of cargo devices such as boat carrier devices, ski racks, sign carriers and the like to the roof of a vehicle and which is rigidly attached to the rain gutter of the roof.

SUMMARY

The preferred embodiment of the present invention, which will be subsequently described in greater detail, is described with reference to a car top carrier comprising an expansible elongated supporting assembly arranged to be mounted transversely of the longitudinal center line of the vehicle. The opposite ends of the supporting assembly are rigidly anchored by the preferred clamping device to the lateral rain gutters of the vehicle. However, it is to be understood that the clamping device may be employed in a wide variety of roof mounted structures.

The preferred clamping device comprises a generally plate-like supporting section arranged in an upright position with its lower edge seated in the trough of the rain gutter. The upper portion of the plate-like member is adapted for attachment to the elongated supporting assembly.

A strap-like clamping member having a lower hook-shaped portion for engaging the lower surface of the rain gutter has a shank extending upwardly around the edge of the rain gutter and through an aperture provided in the upright support member. The back of the shank is curved so that it slidingly bears against the upper edge of the aperture when a clamping force is applied to the upper end of the shank. The curved portion of the shank moves the hook shaped portion in a cammed path from a release position laterally spaced from the rain gutter to a clamping position wherein the hook engages the lower surface of the rain gutter, below the lower edge of the upright support.

The clamping arrangement illustrating the preferred embodiment of the present invention provides a number of advantages including the minimal number of parts required for an operative assembly. The cammed motion of the clamping member permits the device to be easily attached or released from the rain gutter.

It is therefore an object of the present invention to provide an improved clamping assembly for roof mounted carrier structures for a vehicle having a rain gutter formed along its lateral side which can be easily and quickly released or clamped to the rain gutter.

It is another object of the present invention to provide a clamping device engageable with the rain gutter of the roof of an automotive vehicle and having an upright supporting member with a lower edge seated in the trough of the rain gutter, and a hook shaped clamping section with a generally upwardly directed shank portion extending through an aperture of the upright supporting member, the shank provided with a curved portion acting against the upper edge of the aperture so that the hooked portion moves in a cammed path from release to clamping positions upon the application of a clamping force to the upper end of the shank.

It is another object of the present invention to provide a clamping device engageable with the rain gutter of a vehicle including an upright supporting member seated in the trough of the rain gutter, a hook shaped clamping member for embracing the under surface of the rain gutter, the shank of the hook extending upwardly through an aperture in the upright support member, a link member having a lower end pivotally connected to the upper end of the shank, the upper end of the link extending through a second aperture in the upright support member and engageable with a threaded element for applying an upward force on the link so that the link draws the shank of the hook shaped member in a generally upwardly directed motion with the upper edge of the lower aperture acting as a fulcrum on the shank as the hook moves into clamping engagement with the rain gutter.

Still further objects and advantages of the present invention will be readily apparent to one skilled in the art to which the invention pertains upon reference to the following detailed description of the preferred embodiment.

DESCRIPTION OF THE DRAWINGS

The description refers to the accompanying drawings in which like reference characters refer to like parts throughout the several views and in which:

FIGURE 1 is a fragmentary view of an automotive vehicle having a car top carrier rigidly attached to the roof thereof by clamping devices illustrating the preferred embodiment of the present invention;

FIGURE 2 is a sectional view through the horizontal supporting assembly of the cartop carrier of FIGURE 1 and illustrating the locking arrangement for clamping the horizontal supporting assembly at a selected length;

FIGURE 3 is an enlarged elevational, fragmentary view of the preferred clamping device attached to the rain gutter of the vehicle;

DESCRIPTION OF THE PREFERRED EMBODIMENT

Figure 4:
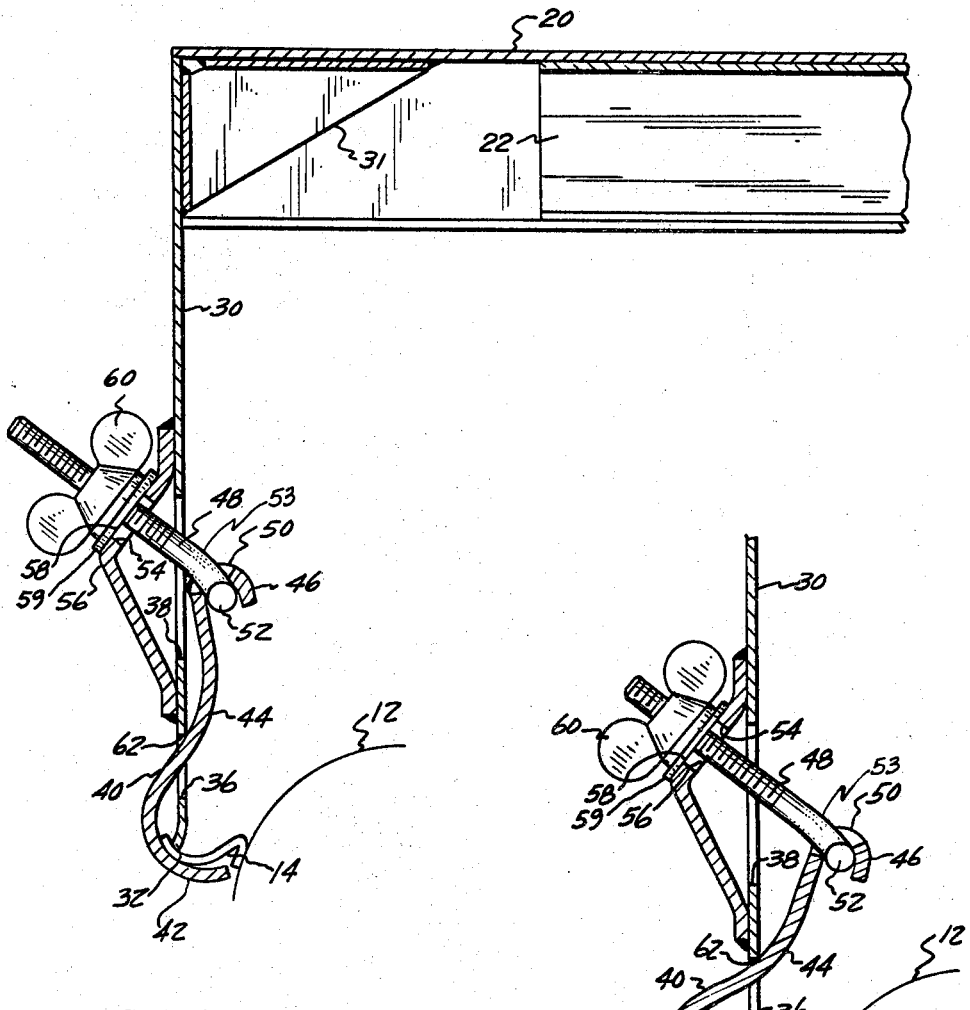
FIGURE 4 is a side view of the clamping device illustrated in FIGURE 3.

Now, referring to the drawings, a conventional motor vehicle 10 is illustrated in FIGURE 1 as having a roof 12 and rain gutters 14 extending along opposite lateral sides of the roof 12. A pair of carrier assemblies generally indicated at 16 are rigidly anchored to the rain gutters 14 of the vehicle.

Each carrier assembly 16 is intended to be attached to vehicles with roofs of different sizes having rain gutters arranged with different transverse distances. Therefore, each carrier assembly 16 includes a transverse, extensible cargo supporting section 18. Each cargo supporting section 18 includes a pair of elongated channel-shaped support members 20. A center channel-shaped member 22 connects the two outer channel support members 20 and is preferably fastened to one of the channel-shaped members by any suitable means such as by welding or the like. The unfastened end of the center channel member 22 is slidably disposed within the sidewalls of the opposite support member 20 so that the overall width of the support members 20 and 22 can be varied to accommodate the distance between the rain gutters 14.

In the extended position of the support members 20 and 22, a clamping block 24 disposed within the sidewalls of the inner support member 22 and a clamping plate 26 bridging the inturned sidewalls of the support member 20 are interconnected by a threaded member 28 so that the inner support member 22 is rigidly attached to the support member 20.

As best seen in FIGURE 4, the outer ends of each of the support members 20 are connected to an upright support member 30 with the connection braced by a bracket 31. The upright support member 30 has a lower edge 32 slightly flared outwardly and seated in the trough of the rain gutter 14. Thus, the upright support member 30 provides a weight transfer connection between the supporting channels 20 and the rain gutters 14.

Referring to FIGURE 3, the upright support member 30 has a series of parallel and vertical stiffening ribs 34 to enable the upright supporting member 32 to oppose lateral bending forces produced by the support members 20. Preferably the lower edge 30 is slightly curved as at 35 to accommodate the curvature of the rain gutters of the more modern automotive vehicles.

Now as can best be seen in FIGURES 3 and 4, each upright support member 30 has a rectangular aperture 36 formed above the lower edge 32. A vertically running slot 38 is formed in the upright support member 30 above the aperture 36.

A substantially rigid, strap-like clamping member 40 having a lower hook-shaped portion 42 cooperates with the upright support 30 to rigidly anchor the carrier assembly 16 to the rain gutter 14.

The inner surface of the hook-shaped portion 42 engages the under surface of the rain gutter 14 in a clamped position as can best be seen in FIGURE 4. The hook-shaped portion 42 merges into a shank portion 44 extending through the aperture 36 and terminating at its upper end in a generally U-shaped portion 46.

A link element 48 extends upwardly through the slot 38. The lower end of the link extends through a slot 50 provided in the U-shaped portion 46 of the clamping member 40 and carries a crossbar 52 which is journaled in the bight of the U-shaped portion 46. The lower end of the link 48 is preferably bent downwardly as at 53. This bent portion provides for a better upward drawing force on the clamp 40 than can be achieved by a straight link. The outer end of the link 48 is threaded and extends through an aperture 54 of a brace element 56. The brace element 56 preferably has a bearing surface 58 arranged at about a 45° angle with respect to the upright member 30 and provides means for seating a washer 59 and a wing nut 60. The wing nut 60 is engaged with the threaded portion of the link element 48 and provides means for imposing an upwardly directed drawing force on the clamping member 40.

Figure 5:
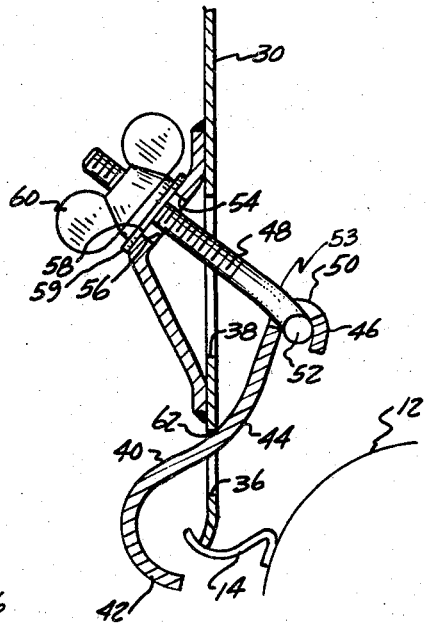
FIGURE 5 is a view similar to FIGURE 4 but showing the clamping member in the release position.
Figure 6:
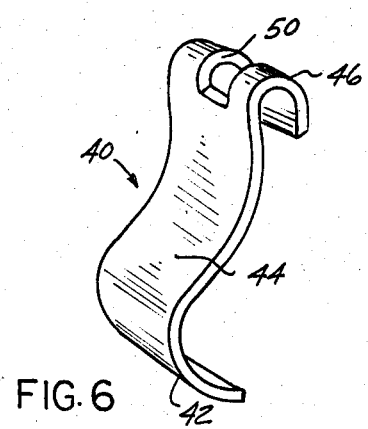
FIGURE 6 is a view of the clamping member separated from the other components.

As the clamping member 40 is drawn upwardly through the aperture 36, the curved outer portion of the shank 44 engages the upper edge 62 of the aperture 36 so that the hooked portion 42 is cammed from the release position illustrated in FIGURE 5 wherein it is laterally spaced from the rain gutter 14 to the clamping position illustrated in FIGURE 4 wherein the inner surface of the hook portion 42 is tightly engaged with the lower surface of the main gutter. It can also be seen in FIGURE 4 that in the fully clamped position, the clamping member 40 acts as a lever with the upper edge 62 acting as a fulcrum to transmit the force applied to the link element 48 to the hook-shaped portion 42.

Preferably in the clamped position, the wing nut 60 is rotated until the outer surface of the U-shaped portion 46 bears against the inner surface of the upright member 30. As the wing nut 60 is rotated, the washer 59 cams the upper end of the link element 48 toward the lower portion of aperture 54 so that there is sufficient space to rotate the nut 60.

It is to be understood that the preferred embodiment of the invention not only provides a clamping arrangement for rigidly anchoring a cargo supporting device or other article above the roof of a vehicle, but the clamping member 40 can be quickly engaged or disengaged from the rain gutter 14 permitting removal of the upright support member 30 from the rain gutter 14.

The lower portion of the upright member 30 and the hook-shaped portion 42 are preferably coated with a suitable plastic material to provide a non-marring engagement with the rain gutter 14.

Although I have described but one preferred embodiment of my invention, it is to be understood that various changes and revisions can be made therein without departing from the spirit of the invention as expressed in the scope of the appended claims.

I claim:

1. A clamping device, useful for releasably mounting a cargo carrier or the like to the roof of an automotive vehicle having a rain gutter along a lateral side of the roof, comprising:
   (a) a first member, said first member having an upstanding portion and lower clamping edge, said clamping edge engageable with the trough of the rain gutter of said vehicle, said upstanding portion having an aperture spaced from said clamping edge, said aperture having a bearing edge;
   (b) a second member, said second member having a hook-shaped portion merging into a shank portion, said hook-shaped portion having a concave portion engageable with the lower surface of said rain gutter, said shank portion extending upwardly and through said aperture; and
   (c) means for applying a generally upward tensile force to the upper extending end of said shank portion so that said bearing edge acts as a fulcrum on the back of said shank portion to transmit said tensile force to said hook-shaped portion so that the concave portion of said hook-shaped portion and said clamping edge engage said rain gutter in a clamping relationship.

2. A clamping device as defined in claim 1, including means interconnecting said first member and said second member, said interconnecting means permitting relative movement of said first member and said second member between a clamping position and a release position, said hook-shaped portion engaged with the under surface of the rain gutter of said vehicle in said clamping position and said hook-shaped portion disposed laterally from the rain gutter in the release position; and means for camming said hook-shaped portion between said release position and said clamping position.

3. A clamping device as defined in claim 1, wherein said last mentioned means comprises, the shank portion of said second member has an arcuate surface, said arcuate surface slidably bearing against the bearing edge of said first member when a generally upward tensile force is applied to the shank portion of said second member so that said hook-shaped portion is thereby cammed from said release position to said clamping position.

4. A clamping device as defined in claim 3, wherein said interconnecting means comprise:
   (a) the shank of said second member merging into a connecting section;
   (b) said first member having a second aperture spaced from said first aperture in a direction upwardly from said clamping edge;
   (c) a link element, said link element pivotally connected to said connecting section of said second member, and said link element extending through said second aperture; and
   (d) means for applying a tensile force on said link element so that said link element draws the arcuate portion of said shank portion through said first aperture with the back of said shank portion slidably engaged with said bearing edge so that said hook-shaped portion moves from the release position to the clamping position.

5. A clamping device as defined in claim 4, wherein the means for applying said tensile force comprises:
   (a) means providing an abutment on the side of said first member opposite the pivotal connection of said link element and said connecting section;
   (b) said second aperture opening to said abutment;
   (c) said link element extending through said second aperture and having a length sufficient to extend beyond said abutment; and
   (d) a threaded element engaged with a threaded portion of said link element and seated on said abutment.

6. A clamping device as defined in claim 5, wherein said second member comprises a substantially rigid, unitary strap section and the clamping edge of said first member forms the lower edge of a plate-like section.

7. A clamping device as defined in claim 6, wherein said second aperture comprises a slot extending in the direction of motion of said link element between said release positions and said clamping positions.

8. A clamping device as defined in claim 4, wherein the pivotal connection between said link element and said shank portion comprises said shank portion having an aperture for receiving said link element and said link element having a crossbar, said crossbar having a length greater than the diameter of the aperture in said shank portion.

9. A clamping device as defined in claim 8, wherein the ends of said shank portion are bent to a generally U-shaped configuration and around said crossbar to provide a journal for said crossbar.

10. A clamping device as defined in claim 1, wherein the clamping surfaces of said first and second members are coated with a plastic material to provide a non-marring engagement with the surfaces of said rain gutter.

11. A clamping device as defined in claim 1, including a second clamping device engageable with a rain gutter formed along the opposite lateral of said vehicle, said second clamping device including an upright member, and including support structure connecting the upright members of each of said clamping devices.

References Cited

UNITED STATES PATENTS 3,141,588  7/1964  McMiller _____ 224—42.1

FOREIGN PATENTS 513,794  2/1955  Italy.

GERALD M. FORLENZA, *Primary Examiner.*

F. E. WERNER, *Assistant Examiner.*